US012631051B2

(12) United States Patent
Sandoval

(10) Patent No.: US 12,631,051 B2
(45) Date of Patent: May 19, 2026

(54) SLIDE SHOE TAG

(71) Applicant: Industrial Security Solutions, Corp., Sparks, NV (US)

(72) Inventor: David Michael Sandoval, Reno, NV (US)

(73) Assignee: Industrial Security Solutions, Corp., Sparks, NV (US)

( * ) Notice: Subject to any disclaimer, the term of this patent is extended or adjusted under 35 U.S.C. 154(b) by 25 days.

(21) Appl. No.: 18/752,561

(22) Filed: Jun. 24, 2024

(65) Prior Publication Data

US 2024/0426143 A1 Dec. 26, 2024

Related U.S. Application Data

(60) Provisional application No. 63/523,006, filed on Jun. 23, 2023.

(51) Int. Cl.
*E05B 73/00* (2006.01)
*A43C 19/00* (2006.01)

(52) U.S. Cl.
CPC .......... *E05B 73/0052* (2013.01); *A43C 19/00* (2013.01)

(58) Field of Classification Search
CPC ............................ E05B 73/0052; A43C 19/00
USPC ........................................................ 70/57.1
See application file for complete search history.

(56) References Cited

U.S. PATENT DOCUMENTS 5,889,463 A 3/1999 Judd et al.
7,474,209 B2 1/2009 Marsilio et al.
7,629,888 B2 12/2009 Forster et al.
8,179,267 B2 * 5/2012 Anderson ........... E05B 73/0017 70/14
8,281,626 B2 * 10/2012 Conti ................. G08B 13/1463 70/57.1
8,294,583 B2 * 10/2012 Sayegh ............... E05B 73/0017 70/57.1
8,573,011 B2 * 11/2013 Thoonsen ........... E05B 73/0017 70/57.1
8,890,689 B2 11/2014 Ezzo et al.
9,245,432 B2 * 1/2016 Yang .................... G08B 13/248
9,472,073 B2 * 10/2016 Yang ................... E05B 73/0041
9,702,170 B2 * 7/2017 Favier ................ G08B 13/2434
10,311,691 B2 6/2019 Yang
11,455,508 B2 9/2022 Sandoval et al.
11,462,088 B2 10/2022 Sandoval et al.
(Continued)

*Primary Examiner* — Nathan Cumar
(74) *Attorney, Agent, or Firm* — Sheppard Mullin Richter & Hampton LLP

(57) ABSTRACT

This disclosure describes a clamp device designed to secure items with straps, such as sandals or slippers, providing enhanced security and ease of use. The clamp device comprises a bottom piece, a left piece, a right piece, and a top piece, wherein the top piece is divided into a first top sub-piece and a second top sub-piece. The first top sub-piece is fixed, while the second top sub-piece is configured to rotate toward or away from the first top sub-piece. The first top sub-piece includes a cavity designed to receive the head of the second top sub-piece. Engagement and locking occur when the head of the second top sub-piece rotates into the cavity of the first top sub-piece, securing the device. This design minimizes damage to the shoe materials and enhances comfort for customers, providing a more secure and customer-friendly solution for protecting merchandise from theft.

30 Claims, 5 Drawing Sheets

(56) References Cited

U.S. PATENT DOCUMENTS

| | | | | |
|---|---|---|---|---|
| 11,530,555 | B2 | 12/2022 | Perreau et al. | |
| 2009/0309736 | A1 | 12/2009 | Heurtier | |
| 2011/0102179 | A1* | 5/2011 | Ezzo | G08B 13/1445 340/568.1 |
| 2012/0091741 | A1* | 4/2012 | Stewart | E05B 73/0017 292/307 A |
| 2012/0326871 | A1* | 12/2012 | Lian | E05B 73/0017 340/572.1 |
| 2014/0104046 | A1* | 4/2014 | Howell | A63B 71/0686 340/323 R |
| 2014/0104061 | A1* | 4/2014 | Luo | G08B 13/1445 340/572.8 |
| 2015/0002259 | A1* | 1/2015 | Favier | E05B 73/0017 340/5.2 |
| 2015/0009033 | A1* | 1/2015 | Sandoval | G08B 13/1436 340/568.6 |
| 2016/0102483 | A1* | 4/2016 | Luo | G02C 11/00 70/57.1 |

* cited by examiner

SLIDE SHOE TAG

CROSS-REFERENCE TO RELATED APPLICATION

This application claims the priority of U.S. Provisional Patent Application No. 63/523,006, filed Jun. 23, 2023. The entire content of the above-identified application is incorporated herein by reference.

TECHNICAL FIELD

This disclosure relates generally to security devices designed to protect merchandise from theft. More specifically, the disclosed technology pertains to a security tag for securing footwear, particularly shoes with upper straps, such as sandals or slippers, collectively referred to as slide shoes. The innovative design of this security tag aims to address the shortcomings of traditional pin-based and cable-based security tags by minimizing damage to the merchandise and enhancing the comfort and convenience for customers trying on the products in-store.

BACKGROUND

Retail stores commonly use security tags to prevent the theft of shoes and other merchandise with straps. There are two prevalent types of security tags: pin-based tags and cable-based tags, illustrated in FIG. 1.

Pin-based tags involve a separate pin that is inserted through a part of the shoe, such as the strap or upper of a sandal or slipper, and then locked into the tag. Store personnel must use a special tool to remove the pin to unlock the shoe. These tags often include electronic circuits or alarms that trigger if someone attempts to improperly remove the pin or take the shoes out of the store while still tagged. However, pin-based tags can potentially damage the shoe's material, especially when the shoe is made of delicate materials such as leather, synthetic fabrics, rubber, PVC, or canvas. Additionally, the pins can be easily lost, posing safety hazards, with reported incidents of customers being injured by loose pins in stores.

Cable-based tags utilize a cable that wraps around a portion of the shoe, such as the strap or upper of a sandal or slipper, and then plugs into the tag similar to pin-based tags, a special tool is required to unplug the cable from the tag to unlock the shoe. These tags often contain an alarm chip as well. The rigid material of the cable, typically metal or hard plastic, provides security but does not conform to the shoe's shape. This rigidity can cause pressure points or friction against the customer's foot when trying on the shoe, leading to discomfort and an unnatural fit. This can make it difficult for customers to assess the true comfort and feel of the shoes, potentially affecting their purchase decision.

Both types of traditional security tags present significant disadvantages, either by risking damage to the merchandise or by detracting from the customer's shopping experience. This has created a need for a more effective and customer-friendly solution.

SUMMARY OF INVENTION

According to various embodiments of the disclosed technology, this application describes a clamp device or a shoe tag specifically designed for sandals or slippers, or other suitable types of shoes having an upper strap. These shoes are collectively called slide shoes for simplicity. This shoe tag avoids damaging the material of the shoes and makes it more comfortable for customers to try on.

In some embodiments, the clamp device may include a bottom piece, a left piece, a right piece, and a top piece. The top piece is further divided into a first top sub-piece and a second top sub-piece, each covering a portion of the top side of the clamp device. The first top sub-piece is fixed, while the second top sub-piece is configured to rotate toward or away from the first top sub-piece. The first top sub-piece includes a cavity for receiving the head of the second top sub-piece, allowing the two sub-pieces to engage and lock securely when the head rotates into the cavity.

In some embodiments, the bottom piece, left piece, and first top sub-piece are fixed together, while the right piece and second top sub-piece are fixed together. The right piece is rotatably mounted to the bottom piece, acting as a rotating shaft that facilitates the rotational movement of the second top sub-piece.

In some embodiments, the cavity on the first top sub-piece includes a protruding tip positioned on the ceiling or floor of the cavity. The head of the second top sub-piece has a corresponding hole, which aligns with the protruding tip to securely hold the sub-pieces together when engaged. Additionally, the cavity may contain a spring installed on the inner wall facing the cavity's opening. This spring generates a counterforce to help pop the head of the second top sub-piece out of the cavity upon unlocking.

In some embodiments, for enhanced security, the first top sub-piece can include an ink container that holds ink, configured to leak if the sub-pieces are disengaged improperly, indicating tampering. In another version, a fake ink container appears to hold colored liquid for visual deterrence. The head of the second top sub-piece may also include a notch to receive the spring installed in the cavity during engagement.

In some embodiments, the right piece is mounted to the bottom piece via a hinge, allowing the right piece and second top sub-piece to rotate toward and away from the first top sub-piece. A magnetic lock mechanism can be included, where a magnetic key interacts with a magnetic lock house to retract or lift the protruding tip, unlocking the sub-pieces.

In some embodiments, the clamp device can be integrally formed as two units: one comprising the bottom piece, left piece, and first top sub-piece, and the other comprising the right piece and second top sub-piece. The device ensures precise alignment of the sub-pieces for secure engagement. The bottom piece, left piece, right piece, and top pieces form a hollow center, designed to receive straps of shoes or other products with straps.

In summary, the clamp device offers a robust and versatile clamping solution with features ensuring secure engagement, tamper evidence, and ease of use. Its design caters to various applications, making it suitable for use in products requiring secure clamping mechanisms.

DETAILED DESCRIPTION

The present invention provides an improved security tag specifically designed for shoes with straps, such as sandals or slippers, collectively referred to as slide shoes. This innovative shoe tag addresses the shortcomings of traditional pin-based and cable-based security tags by minimizing damage to the shoe materials and enhancing comfort for customers.

Figure 1:
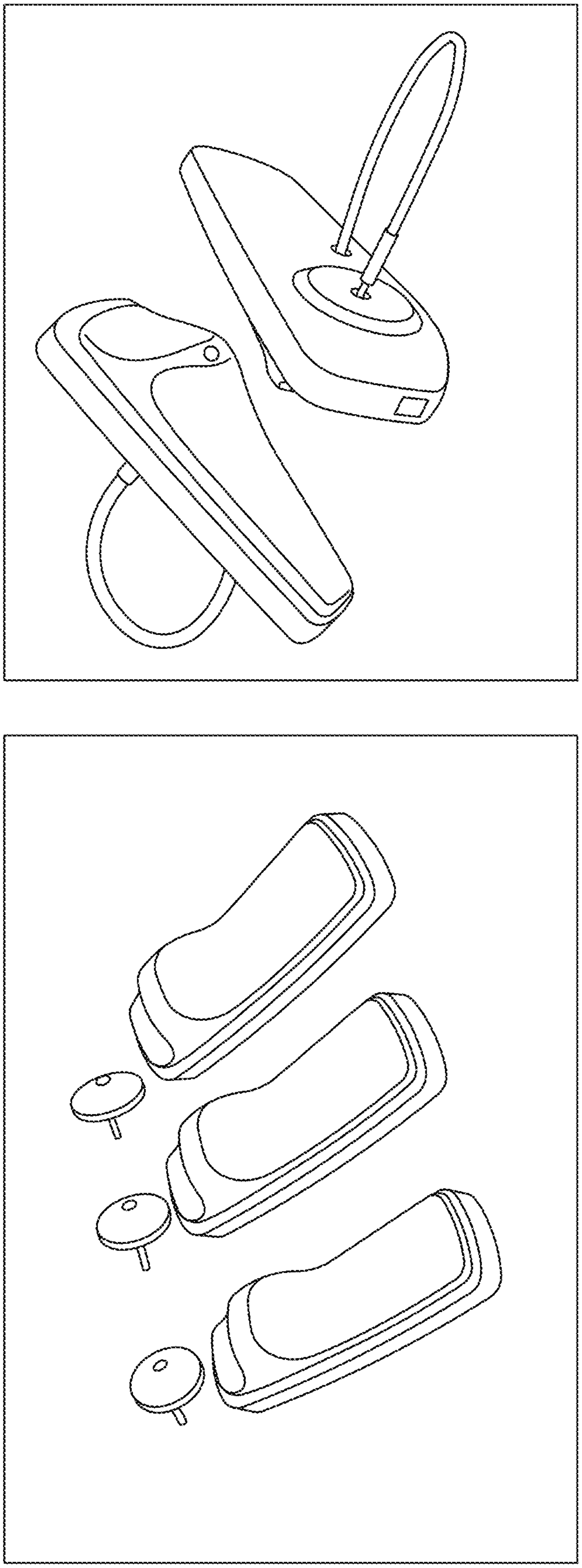
FIG. 1 illustrates traditional security tags for shoes.
Figure 2:
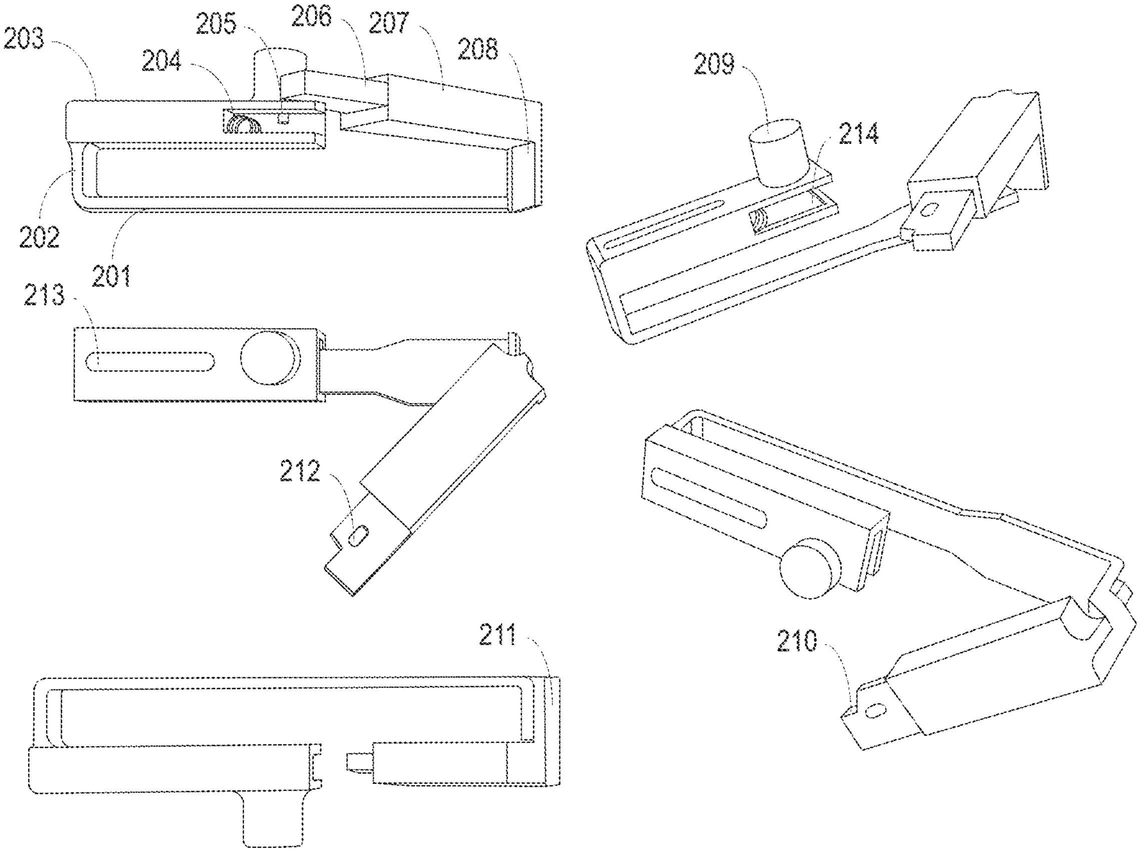
FIG. 2 illustrates multiple view perspectives of the shoe tag, in accordance with some embodiments.

FIG. 2 illustrates a diagram of the shoe tag, in accordance with some embodiments.

The depicted shoe tag is designed as a clamp device (referred to as "clamp" in the following description for simplicity) specifically for securing shoes with straps. The shoe tag features a hollow center and four main sides: a bottom piece 201, a left piece 202, a right piece 208, and a top piece. The absence of a front or rear piece creates the hollow center. The top piece is divided into two sub-pieces: a first top sub-piece 203 and a second top sub-piece 207, each covering a portion of the top side of the clamp. The bottom piece 201, left piece 202, and first top sub-piece 203 are fixed together, while the right piece 208 and second top sub-piece 207 are fixed together.

The right piece 208 is rotatably mounted to the right end of the bottom piece 201, acting as the rotating shaft. For instance, the right piece 208 may include a hinge 211 that facilitates rotation. During this rotation, the second top sub-piece 207 also rotates due to its fixed connection with the right piece 208. The second top sub-piece 207 can rotate toward the first top sub-piece 203 to engage and lock, or away from first top sub-piece 203 to create an opening for receiving shoe straps or other materials, thereby locking them in place by engaging with the first top sub-piece 203.

The first top sub-piece 203 includes an end with a cavity 214, a recessed area within the clamp. Inside this cavity 214, there is a retractable or liftable protruding tip 205 located either on the ceiling or floor of the cavity. This protruding tip can be pulled back or lifted using a magnetic force, such as a magnetic key.

The second top sub-piece 207 has an end with a thin head 206 designed to fit into the cavity 214 of the first top sub-piece 203. When the second top sub-piece 207 rotates toward the first top sub-piece 203, the two sub-pieces engage, and the thin head 206 of the second top sub-piece 207 enters the cavity 214 of the first top sub-piece 203, creating a locked state. The protruding tip 205 within the cavity 214 aligns with a hole 212 on the thin head 206 of the second top sub-piece 207, securely holding the two sub-pieces together.

Within the cavity 214, a spring 204 is installed on the inner wall, facing the opening of the cavity 214. When the two sub-pieces are engaged, the thin head 206 of the second top sub-piece 207 applies pressure to the spring 204, compressing it against the inner wall of the cavity 214. This compression generates a counterforce on the thin head 206, exerted by the spring 204.

The force from the spring 204 remains as long as the protruding tip 205 in the cavity 214 maintains the lock on the second top sub-piece 207. To unlock the two sub-pieces, a special device or key can be used to retract or lift the protruding tip 205 within the cavity 214, for example, by tapping on the magnetic lock house 209. This action releases the thin head 206 of the second top sub-piece 207, allowing the pushing force from the spring 204 within the cavity 214 to push the thin head 206 out of the cavity 214. This pushing force assists store personnel in opening the clamp.

This mechanism ensures a secure connection between the two top sub-pieces, with the protruding tip 205 and the spring 204 working together to maintain the lock and facilitate the release of the clamp for attaching shoe straps or other materials.

Additionally, the first top sub-piece 203 may include an ink container 213. The ink leaks from the ink container 213 when the clamp is tampered with or forcibly opened (e.g., disengaging the first top sub-piece 203 and the second top sub-piece 207 without a proper unlocking mechanism). In an alternative embodiment, the ink container may be a decoy that appears to hold colored liquid, designed to deter potential thieves by making them think that the container will leak ink if tampered with.

The thin head 206 on the second top sub-piece 207 may have a notch 210, which receives the spring 204 in the cavity 214 when engaging with the first top sub-piece 203.

Figure 3:
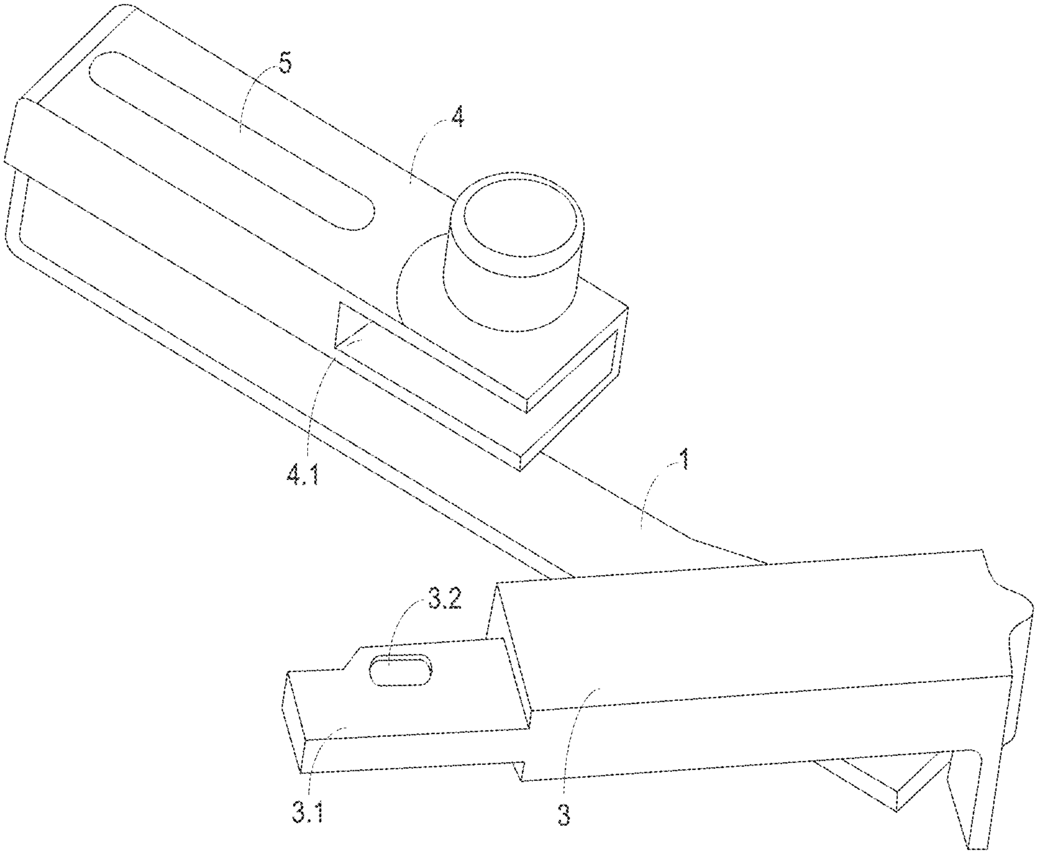
FIG. 3 illustrates a diagram of the shoe tag, in accordance with some embodiments.

FIG. 3 illustrates a detailed diagram of the shoe tag according to some embodiments. Similar to the design depicted in FIG. 2, the shoe tag in FIG. 3 consists of several key components: a bottom piece 1, a first top sub-piece 4, and a second top sub-piece 3. These components work together to secure the shoe strap effectively.

The first top sub-piece 4 and the second top sub-piece 3 are designed to engage with each other to form a secure lock. The engagement occurs when the second top sub-piece 3 rotates towards the first top sub-piece 4. The rotation allows the thin head 3.1 of the second top sub-piece 3 to fit snugly into the cavity 4.1 of the first top sub-piece 4.

The thin head 3.1 is a critical part of the locking mechanism. It is specifically designed to align with and enter the cavity 4.1, ensuring a secure fit. Within the cavity 4.1, there is a protruding tip (identified as 205 in FIG. 2, though not shown in FIG. 3). The thin head 3.1 includes a hole 3.2, which is intended to engage with this protruding tip. When the thin head 3.1 is fully inserted into the cavity 4.1, the hole 3.2 aligns with the protruding tip 205, effectively locking the two sub-pieces together.

This locking mechanism ensures that the shoe tag remains securely fastened until it is intentionally unlocked using the appropriate tool or key. The detailed design of the thin head and cavity, along with the engagement of the protruding tip, provides a robust and reliable security solution for protecting shoes with straps from theft.

Figure 4:
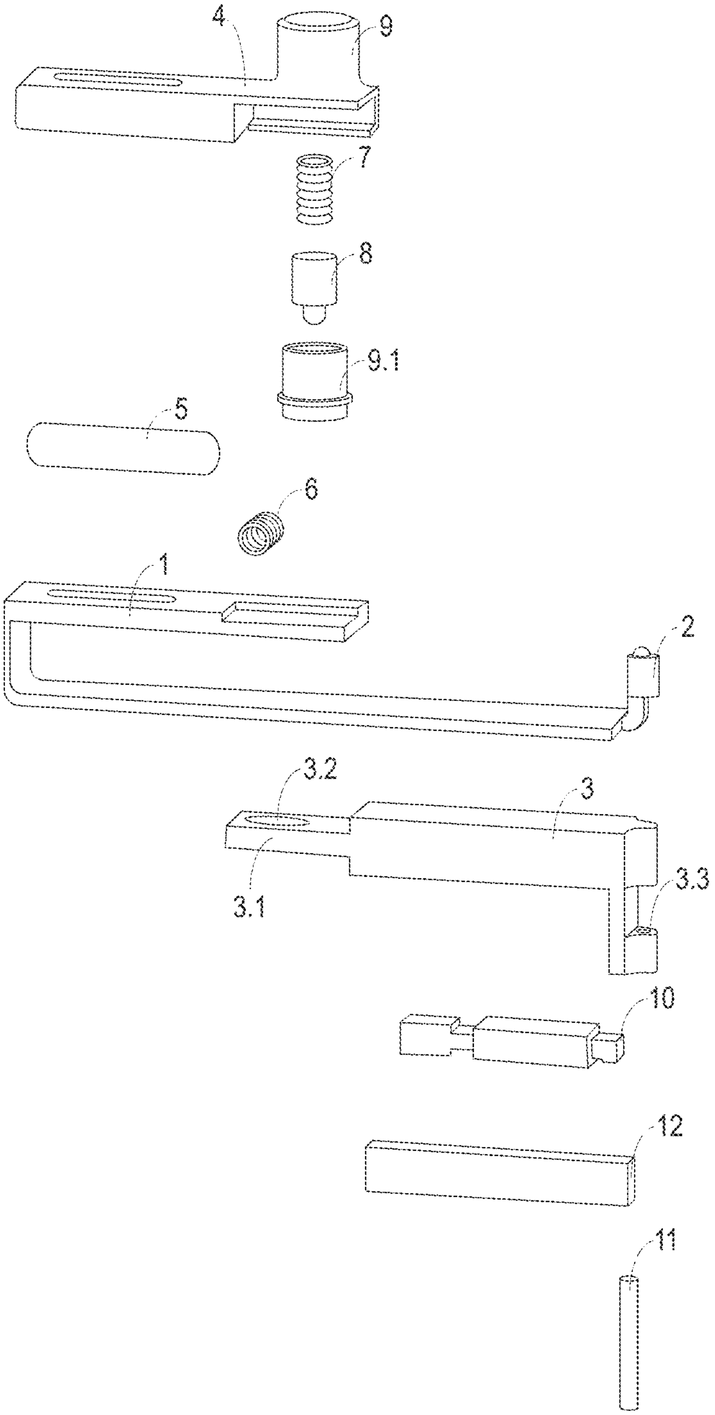
FIG. 4 illustrates an exploded diagram of the shoe tag, in accordance with some embodiments.

FIG. 4 illustrates an exploded diagram of the shoe tag, in accordance with some embodiments. In addition to the elements mentioned in FIG. 2 and FIG. 3, FIG. 4 also illustrates that the shoe tag may include a first top piece assembly, including a first piece 4 and a second piece 1. The first piece 4 may include a magnetic housing 9. The first piece 4 and the second piece 1 may sandwich a spring 7, a protruding tip 8, a housing for the protruding tip 9.1 to be hosted inside the magnetic housing 9, a ink container 5, and another spring 6. These components allow a key (e.g., a magnetic key) to lift up the protruding tip 8 when the key taps against the magnetic housing 9 or surrounding area.

FIG. 4 also shows a hinge 2 on the bottom piece, which engages the bottom piece with the right piece 3 through the receiver 3.3 to form the rotating shaft. The right piece 3 may also include a thin head 3.1 with a hole 3.2.

FIG. 4 further illustrates that the shoe tag may include a pin 11 to secure the hinge 2 on the bottom piece and the receiver 3.3 on the right piece 3. The shoe tag may further include a magnetic component 10 and a cover 12 covering the magnetic component 10 inside the right piece 3.

Other embodiments can be contemplated based on the description above. For example, the right side piece may be fixed to the bottom piece, and the second top sub-piece may be rotatably mounted to the top of the right side piece.

The terms "left, right, top, bottom" are used for illustrative purposes. These terms are intended to encompass different orientations of the device in addition to different orientations than those depicted in the figures. A person skilled in the art would appreciate that the above description can be adapted to other similar designs by simply changing the position or side of the components. It is also appreciated that the shoe tag does not have to be used only on shoes. Rather, it can be applied to any product having straps.

Figure 5:
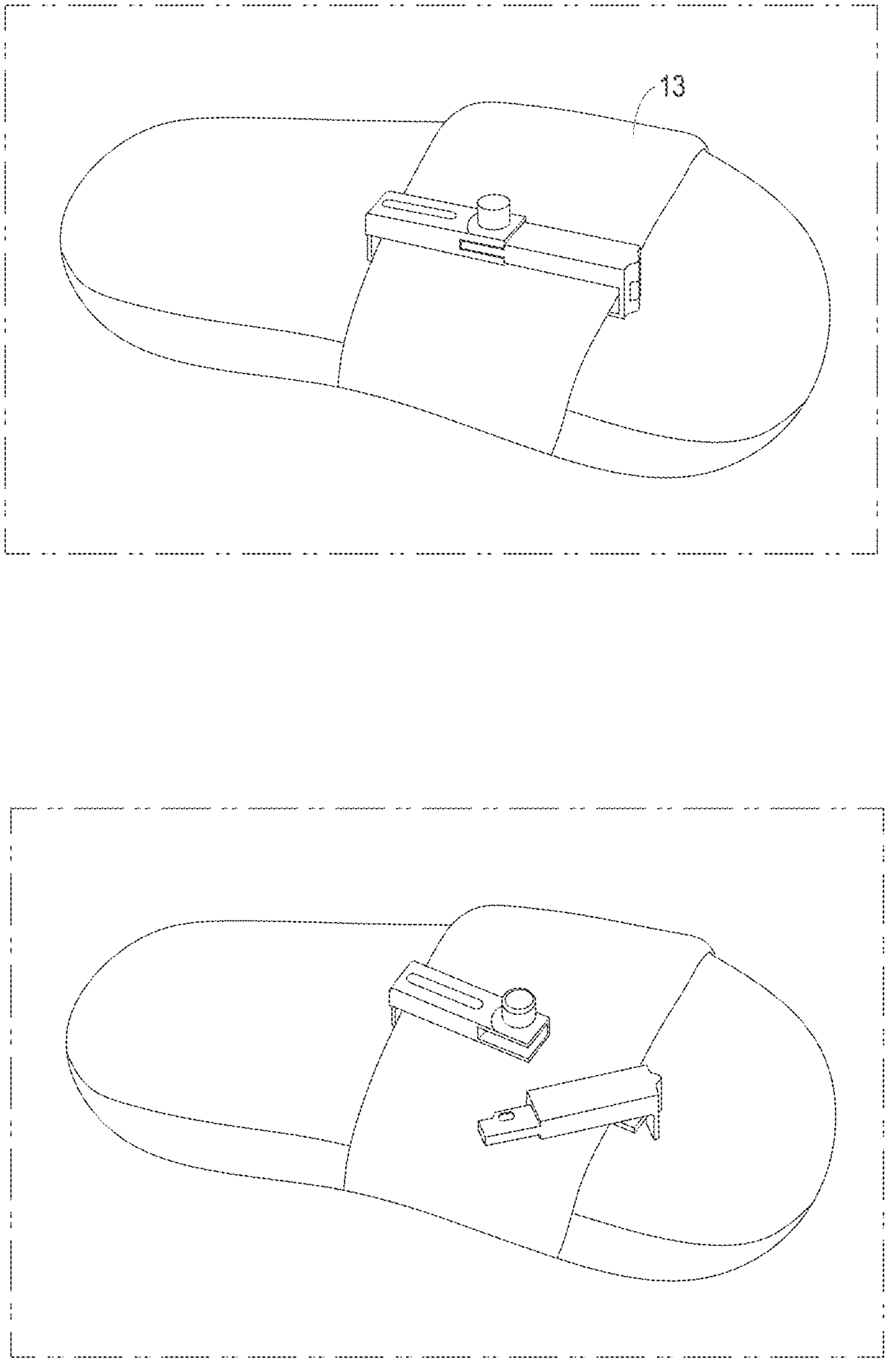
FIG. 5 illustrates a use case of the shoe tag, in accordance with some embodiments.

FIG. 5 illustrates a use case of the shoe tag, in accordance with some embodiments. The top diagram in FIG. 5 shows that the shoe tag described above locks the strap 13 of a slide shoe by engaging the two top sub-pieces. The bottom diagram in FIG. 5 shows that the shoe tag is in an unlocked state when the two top sub-pieces are disengaged.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

Although this invention has been disclosed in the context of certain implementations and examples, it will be understood by those skilled in the art that the present invention extends beyond the specifically disclosed implementations to other alternative implementations and/or uses of the invention and obvious modifications and equivalents thereof. Thus, it is intended that the scope of the present invention herein disclosed should not be limited by the particular disclosed implementations described above.

Furthermore, the skilled artisan will recognize the interchangeability of various features from different implementations. In addition to the variations described herein, other known equivalents for each feature can be mixed and matched by one of ordinary skill in this art to construct analogous systems and techniques in accordance with principles of the present invention.

It is to be understood that not necessarily all objects or advantages may be achieved in accordance with any particular implementation of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

What is claimed is:

1. A clamp device, comprising:

a bottom piece, a left piece, a right piece, and a top piece, the top piece comprising a first top sub-piece and a second top sub-piece, each covering a portion of a top side of the clamp device, wherein:

the first top sub-piece is fixed and the second top sub-piece is configured to rotate away from or toward the first top sub-piece;

the first top sub-piece comprises a cavity for receiving a head of the second top sub-piece;

the first top sub-piece and the second top sub-piece are engaged and locked when the head of the second top sub-piece rotates into the cavity of the first top sub-piece, wherein the bottom piece, the left piece, and the first top sub-piece are fixed together;

the right piece and the second top sub-piece are fixed together; and the right piece is rotatably mounted to an end of the bottom piece, and is configured as a rotating shaft that rotates the second top sub-piece away or toward the first top sub-piece.

2. The clamp device of claim 1, wherein:

the cavity on the first top sub-piece comprises a protruding tip positioned on a ceiling or a floor of the cavity, the head of the second top sub-piece comprises a hole, and when the head of the second top sub-piece rotates into the cavity of the first top sub-piece, the protruding tip aligns with the hole on the head to securely hold the first top sub-piece and the second top sub-piece together.

3. The clamp device of claim 2, further comprising a magnetic lock house, wherein the protruding tip is retractable or liftable using a magnetic key that interacts with the magnetic lock house to unlock the first top sub-piece from the second top sub-piece.

4. The clamp device of claim 1, wherein:

the cavity on the first top sub-piece comprises a spring installed on an inner wall of the cavity, facing an opening of the cavity, and the spring is configured to generate a counterforce when the head of the second top sub-piece rotates into the cavity of the first top sub-piece and is locked therein, and to help pop the head of the second top sub-piece out of the cavity upon unlocking.

5. The clamp device of claim 1, wherein:

the first top sub-piece comprises an ink container that holds ink, and the ink container is configured to leak the ink when the first top sub-piece and the second top sub-piece are disengaged improperly.

6. The clamp device of claim 5, wherein the first top sub-piece and the second top sub-piece are disengaged improperly when the first top sub-piece and the second top sub-piece are tampered with or forcibly disengaged without using an unlocking mechanism.

7. The clamp device of claim 1, wherein:

the first top sub-piece comprises an ink container that appears to hold colored liquid.

8. The clamp device of claim 1, wherein:

the head of the second top sub-piece comprises a notch, configured to receive a spring installed in the cavity when the first top sub-piece engages with the second top sub-piece.

9. The clamp device of claim 1, wherein the bottom piece, the left piece, and the first top sub-piece are integrally formed as a single unit, and the right piece and the second top sub-piece are integrally formed as another single unit.

10. The clamp device of claim 1, wherein the bottom piece, the left piece, the right piece, and the top piece form a hollow center.

11. The clamp device of claim 10, wherein the hollow center is configured to receive straps of shoes or other products with straps.

12. A clamp device, comprising:

a bottom piece, a left piece, a right piece, and a top piece, the top piece comprising a first top sub-piece and a second top sub-piece, each covering a portion of a top side of the clamp device, wherein:

the first top sub-piece is fixed and the second top sub-piece is configured to rotate away from or toward the first top sub-piece;

the first top sub-piece comprises a cavity for receiving a head of the second top sub-piece;

the first top sub-piece and the second top sub-piece are engaged and locked when the head of the second top sub-piece rotates into the cavity of the first top sub-piece; and the first top sub-piece comprises an ink container that appears to hold colored liquid.

13. The clamp device of claim 12, wherein:

the cavity on the first top sub-piece comprises a protruding tip positioned on a ceiling or a floor of the cavity, the head of the second top sub-piece comprises a hole, and when the head of the second top sub-piece rotates into the cavity of the first top sub-piece, the protruding tip aligns with the hole on the head to securely hold the first top sub-piece and the second top sub-piece together.

14. The clamp device of claim 13, further comprising a magnetic lock housing, wherein the protruding tip is retractable or liftable using a magnetic key that interacts with the magnetic lock housing to unlock the first top sub-piece from the second top sub-piece.

15. The clamp device of claim 12, wherein:

the cavity on the first top sub-piece comprises a spring installed on an inner wall of the cavity, facing an opening of the cavity, and the spring is configured to generate a counterforce when the head of the second top sub-piece rotates into the cavity of the first top sub-piece and is locked therein, and to help pop the head of the second top sub-piece out of the cavity upon unlocking.

16. The clamp device of claim 12, wherein:

the ink container holds ink, and is configured to leak the ink when the first top sub-piece and the second top sub-piece are disengaged improperly.

17. The clamp device of claim 12, wherein:

the head of the second top sub-piece comprises a notch, configured to receive a spring installed in the cavity when the first top sub-piece engages with the second top sub-piece.

18. The clamp device of claim 12, wherein the bottom piece, the left piece, and the first top sub-piece are integrally formed as a single unit, and the right piece and the second top sub-piece are integrally formed as another single unit.

19. The clamp device of claim 12, wherein the head of the second top sub-piece includes a hole designed to align with a protruding tip within the cavity of the first top sub-piece, ensuring secure engagement.

20. The clamp device of claim 12, wherein the bottom piece, the left piece, the right piece, and the top piece form a hollow center.

21. The clamp device of claim 20, wherein the hollow center is configured to receive straps of shoes or other products with straps.

22. A clamp device, comprising:

a bottom piece, a left piece, a right piece, and a top piece, the top piece comprising a first top sub-piece and a second top sub-piece, each covering a portion of a top side of the clamp device, wherein:

the first top sub-piece is fixed and the second top sub-piece is configured to rotate away from or toward the first top sub-piece;

the first top sub-piece comprises a cavity for receiving a head of the second top sub-piece;

the first top sub-piece and the second top sub-piece are engaged and locked when the head of the second top sub-piece rotates into the cavity of the first top sub-piece; and the bottom piece, the left piece, the right piece, and the top piece form a hollow center.

23. The clamp device of claim 22, wherein:

the cavity on the first top sub-piece comprises a protruding tip positioned on a ceiling or a floor of the cavity, the head of the second top sub-piece comprises a hole, and when the head of the second top sub-piece rotates into the cavity of the first top sub-piece, the protruding tip aligns with the hole on the head to securely hold the first top sub-piece and the second top sub-piece together.

24. The clamp device of claim 23, further comprising a magnetic lock housing, wherein the protruding tip is retractable or liftable using a magnetic key that interacts with the magnetic lock housing to unlock the first top sub-piece from the second top sub-piece.

25. The clamp device of claim 22, wherein:

the cavity on the first top sub-piece comprises a spring installed on an inner wall of the cavity, facing an opening of the cavity, and the spring is configured to generate a counterforce when the head of the second top sub-piece rotates into the cavity of the first top sub-piece and is locked therein, and to help pop the head of the second top sub-piece out of the cavity upon unlocking.

26. The clamp device of claim 22, wherein:

the first top sub-piece comprises an ink container that holds ink, and the ink container is configured to leak the ink when the first top sub-piece and the second top sub-piece are disengaged improperly.

27. The clamp device of claim 22, wherein:

the first top sub-piece comprises an ink container that appears to hold colored liquid.

28. The clamp device of claim 22, wherein:

the head of the second top sub-piece comprises a notch, configured to receive a spring installed in the cavity when the first top sub-piece engages with the second top sub-piece.

29. The clamp device of claim 22, wherein the hollow center is configured to receive straps of shoes or other products with straps.

30. The clamp device of claim 22, wherein the bottom piece, the left piece, and the first top sub-piece are integrally formed as a single unit, and the right piece and the second top sub-piece are integrally formed as another single unit.

* * * * *